July 16, 1968 L. W. GUTH 3,393,021
BEARING UNIT
Filed Aug. 2, 1965
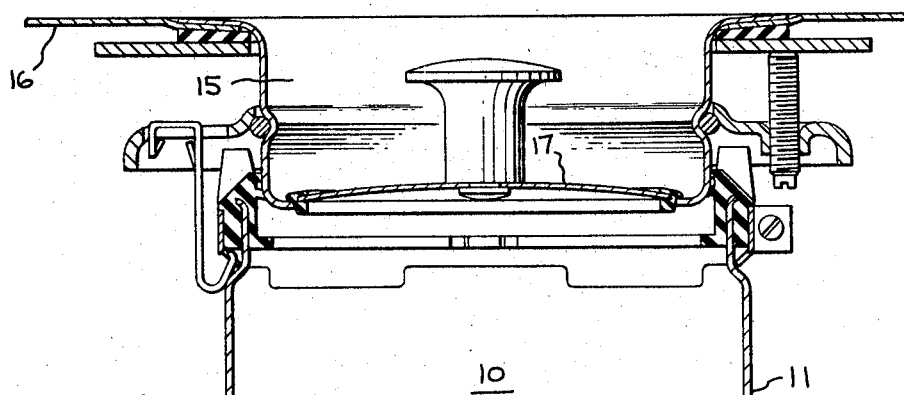
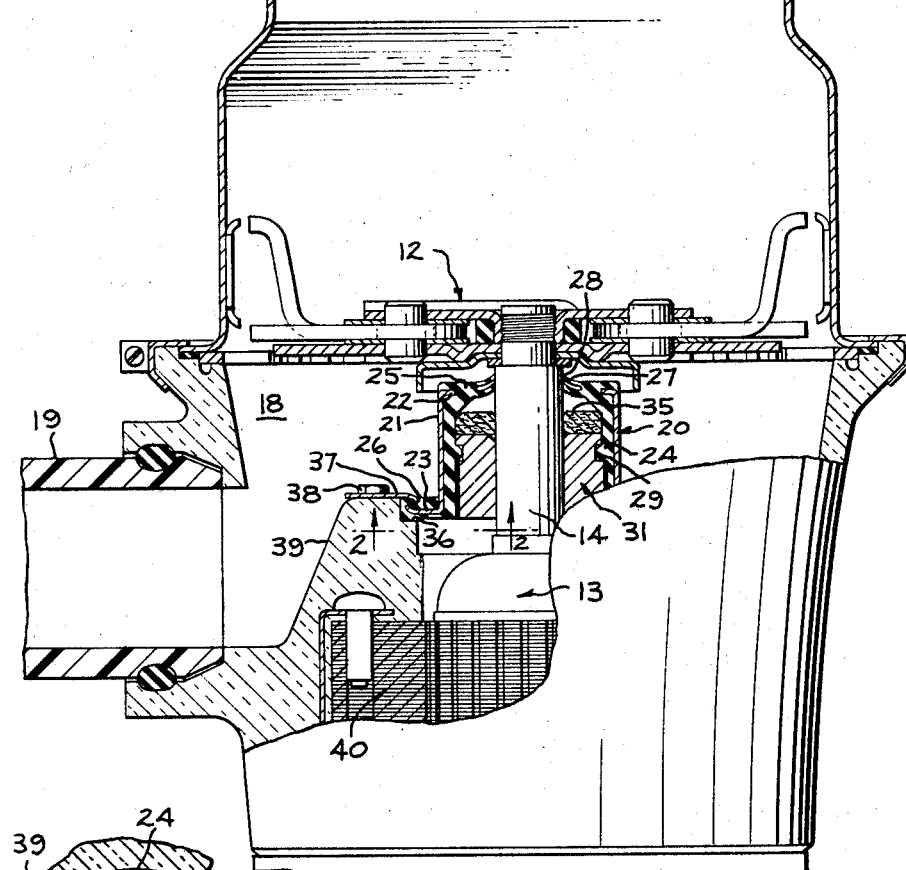
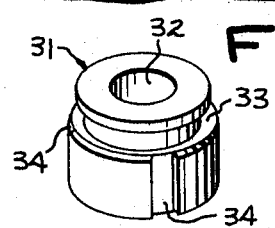
INVENTOR.
LAUREN W. GUTH
BY James E. Espe
HIS ATTORNEY : 3,393,021
Patented July 16, 1968

3,393,021
BEARING UNIT
Lauren W. Guth, Louisville, Ky., assignor to General
Electric Company, a corporation of New York
Filed Aug. 2, 1965, Ser. No. 476,434
8 Claims. (Cl. 308—26)

ABSTRACT OF THE DISCLOSURE

A bearing unit comprising a radial bearing having one or more recesses in its outer wall, a resilient liner having one or more projections in its inner wall generally complementary to and slightly smaller than the bearing recesses, and a rigid sleeve surrounding and secured to the liner outer wall. The projections are seated in the recesses to prevent excessive relative movement between the bearing and the liner and sleeve but to allow a sufficient amount of such movement to compensate for initial misalignment therebetween. The resilient liner may also be provided with portions at its opposite ends for forming a fluid seal.

---

The present invention relates to bearing units and particularly to bearing units which provide a fluid seal about the shaft of an electric motor.

The present invention finds use in the type of device wherein a rotating element contained within a fluid-receiving chamber is driven by a shaft leading to an electric motor located outside the chamber. One example of this type of device is a food waste disposer which includes a rotating comminuting means in a fluid and waste receiving chamber. The comminuting means is usually mounted on, and driven by, a shaft extending through the bottom wall of the chamber to an electric motor located below. Other examples of the type of device to which the present invention applies include washing machines having bottom-driven agitators and dishwashers having bottom-driven spray arms.

As there will always be some clearance between the rotatable motor shaft and the stationary surrounding chamber wall at the point at which the shaft enters the chamber, it is necessary to provide a fluid seal at this point to prevent the escape of fluid from the chamber. One probable consequence if fluid escape is not prevented is destruction of the electric motor due to short circuiting. It may also be desirable to provide a bearing surface for the shaft near the chamber wall in order to locate the motor shaft with a minimum of frictional drag on the shaft. While the prior art reveals units which attempt to provide both the fluid seal and the bearing surface mentioned above, all of these units suffer from certain deficiencies. For instance, prior art units use a relatively large number of parts, which not only increase the cost of manufacturing and assembling the unit, but also create additional fluid sealing problems in that the surfaces between each of the several parts have to be sealed. Another deficiency common to the prior art units is that no means are normally provided for locating and maintaining a bearing surface in the desired position relative to a motor stator. Or if such means are provided, they hold the bearing surface in a single unyielding position. As a result, a slightly misaligned motor shaft might press heavily against a small portion of the bearing surface, thus increasing the frictional drag the surface is intended to minimize.

It is one object of the present invention to provide a bearing unit which forms an effective fluid seal with a minimum number of parts.

It is another object of the present invention to provide a bearing unit in which a bearing surface is automatically located and yieldingly maintained in a desired position relative to a motor stator.

It is still another object of the present invention to provide a bearing unit which, due to its unique construction, may be more inexpensively manufactured and more easily assembled than units known in the prior art.

In accordance with the illustrated embodiment of the invention, a bearing unit is provided which, in one aspect, includes a sleeve having a resilient liner secured thereto, which liner has one or more projections on its own inner surface. The resilient liner also includes portions at each end which are utilized in forming effective fluid seals. Located coaxially within the liner and sleeve is an apertured bearing having recesses which are complementary to the projections on the inner liner surface. The liner projections are received in the bearing recesses to maintain the bearing in a desired position relative to the sleeve and liner.

While the specification concludes with claims particularly pointing out and distinctly claiming the subject matter regarded as the invention, it is believed that the invention will be better understood from the following description taken in connection with the accompanying drawing in which:

FIGURE 1 is a vertical cross-sectional view of a food waste disposer including an embodiment of the present invention;

FIGURE 2 is a cross-sectional plan view of the bearing unit taken on line 2—2 of FIGURE 1;

FIGURE 3 is a perspective view of the apertured bearing used in the present invention.

Referring in detail to the drawing and particularly to FIGURE 1, there is shown a detailed illustration of a food waste disposer 10 which is representative of the type of device in which the present invention could be used to advantage. This disposer comprises three main parts; namely, a cylindrical chamber 11, a rotatable element or comminuting means 12 located adjacent the bottom of the chamber, and a vertically-disposed motor 13 located beneath the comminuting means and operatively connected thereto by means of motor shaft 14 which projects into the chamber at chamber wall 39. Motor 13 is mounted beneath chamber wall 39 by imbedding its stator 40 within the material beneath the wall. However, any other suitable mounting system may be used in practicing the present invention. Regardless of the system used, there is usually a problem of proper alignment since the motor shaft will not always be situated in the same place relative to the chamber wall 39.

The upper end of chamber 11 is designed to be suspended from the drain opening or sink flange of a typical kitchen sink 16. A simple stopper 17 may be positioned within the sink flange 15 to serve as a stopper or plug for the sink if it is desired to fill the sink with water. This stopper is easily removable for the loading of food waste into the chamber 11 and for passage of water into the chamber continuously during the comminuting operation. The food wastes are macerated as they pass through the comminuting means 12 into a sump 18 located immediately below. The macerated food wastes are then flushed from the sump 18 through an outlet pipe 19 to a conventional sewer line.

The preceding description is intended to be background material only and, as such, forms no part of the present invention.

The present invention comprises an improved bearing unit 20 which is located within sump 18 and which surrounds shaft 14. The bearing unit 20 is located directly below the comminuting means 12 so that it is subjected to the flow of fluids and macerated food wastes. Bearing unit 20 includes a cylindrical sleeve 21 having a generally radially inwardly extending flange 22 at its upper end and a generally radially outwardly extending flange 23 at its lower end. A resilient liner 24 is molded to the inner surface of cylindrical sleeve 21 and includes an integral annular portion 25 extending inwardly from flange 22 and an integral skirt 26 encompassing flange 23. The annular portion 25 of the resilient liner 24 has a double-walled central portion 27 having an aperture 28 for shaft 14. The space between the double walls may be filled with a viscous lubricating compound to minimize wear as shaft 14 moves relative to the liner.

The resilient liner 24 also includes an annular ridge 29 on its inner surface as well as a plurality of axially extending ridges 30, as may best be seen in FIGURE 2. In the illustrated embodiment, ridges 29 and ridges 30 are mutually perpendicular. The ridges are generally complementary to grooves formed in a bearing 31, made of brass or other suitable material. As may be best seen in FIGURE 3, bearing 31 includes a central aperture 32 as well as an annular groove 33 within which ridge 29 is received and a plurality of axially extending grooves 34 within which ridges 30 are received. Grooves 33 and 34 are made slightly larger than their respective complementary ridges 29 and 30 so that a measurable, though very limited, amount of movement may occur between bearing 31 and liner 24 as shaft 14 is initially inserted into central aperture 32. This is intended primarily to allow for any longitudinal misalignment between shaft 14 and aperture 32. However, bearing 31 is held against excessive axial movement by the interaction of ridge 29 and groove 33, and, similarly against excessive rotative movement by ridges 30 and grooves 34.

Bearing 31 is shorter than the resilient liner so that a cavity exists between one end of the bearing and the annular portion 25 of resilient liner 24. A lubricant-impregnated ring 35 is disposed within the existing cavity in contact with the shaft 14.

As was brought out above, a fluid seal is provided at the upper end of the bearing unit which may be improved by placing a lubricating compound within the double-walled central portion 27 when that portion is in contact with shaft 14. A static seal is provided at the lower end of the bearing unit by seating the skirt 26 on an annular shoulder 36 formed in the chamber wall 39 above the motor 13. A clamping plate 37, which rests on wall 39, may be tightened into engagement with the skirt 26 by any suitabe means, such as a bolt 38 which is threaded into the material forming wall 39, to force skirt 26 into fluid-tight relationship with shoulder 36.

Because of its unique construction, the various components of the bearing unit may be easily assembled before the unit is placed in the device in which it is to be used. After the resilient liner 24 is molded to the cylindrical sleeve 21, the lubricant-retaining ring 35 is placed within the molded assembly adjacent the annular portion 25. Bearing 31 is then inserted into the liner and becomes properly positioned when the ridges on the liner are received within the grooves on the bearing.

Although it should be apparent from the preceding description, resilient liner 24 provides not only an effective sealing means at the upper and lower ends of the bearing unit, but additionally provides bearing-positioning means within the unit. Thus, a single part effectively replaces the several separate parts used in the prior art devices to accomplish the same functions and gives concentricity of seal, bearing and skirt.

It is to be understood that the function of the sleeve 21 is to provide structural rigidity to the resilient liner 24 and, in the preferred embodiment, a sleeve is employed. However, it is within the spirit and scope of the present invention to modify the preferred embodiment to the extent that sleeve 21 may be obviated by making the outer portion of liner 24 less resilient so that it has inherent structural rigidity.

As will be evident from the foregoing description, certain aspects of the invention are not limited to the particular details of construction of the example illustrated, and it is contemplated that various other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. An improved bearing unit comprising:
  (a) a hollow substantially cylindrical member having a generally radially inwardly extending annular portion at one end, a generally radially outwardly extending skirt at the other end, and at least one non-helical projection on its own inner surface; and
  (b) an apertured bearing coaxial with said member and having a recess generally complementary to and slightly larger than said projection,
  (c) said projection being received within said recess to prevent excessive relative movement between said bearing and said member while centering said bearing coaxially within said member.

2. An improved bearing unit comprising:
  (a) a sleeve;
  (b) a resilient liner within said sleeve having a generally radially inwardly extending annular portion at one end, a generally radially outwardly extending skirt at the other end, and at least one non-helical projection on its own inner surface; and
  (c) an apertured bearing coaxial with said liner and sleeve and having a recess generally complementary to and slightly larger than said projection,
  (d) said projection being received within said recess to prevent excessive relative movement between said bearing and said liner and sleeve while centering said bearing coaxially within said sleeve.

3. The improved bearing unit of claim 2 wherein:
  (a) said liner has at least two projections on its own inner surface and said projections comprise at least two non-helical non-parallel ridges; and
  (b) said bearing has recesses complementary to and slightly larger than said ridges.

4. An improved bearing unit including:
  (a) a sleeve;
  (b) a resilient liner within said sleeve having a generally radially inwardly extending annular portion at one end, a generally radially outwardly extending skirt at the other end, and at least one set of non-helical non-parallel ridges on its own inner surface;
  (c) an apertured bearing coaxial with said liner and having recesses generally complementary to and slightly larger than the non-parallel ridges on said liner,
  (d) said ridges being received in the recesses to prevent excessive relative movement between said bearing and said liner and sleeve while centering said bearing within said sleeve,
  (e) said bearing being shorter than said liner so that a cavity exists between one end of said bearing and one end of said liner; and
  (f) a lubricant-impregnated ring coaxially disposed within the existing cavity.

5. An improved bearing unit for a motor shaft including:
  (a) a cylindrical sleeve having a generally radially inwardly extending flange at its first end and a generally radially outwardly extending flange at its second end,
  (b) a resilient liner for said sleeve having portions encompassing the flanges at the ends of said sleeve,
  (c) said portion encompassing said inwardly extending flange including a double-walled central portion having a central aperture for receiving the motor shaft,
  (d) said liner also having at least one set of non-helical non-parallel ridges on its inner surface,
  (e) an apertured bearing for rotatably receiving the motor shaft coaxial with said liner and sleeve and having recesses generally complementary to and slightly larger than said ridges on said liner, (f) said ridges being seated within the recesses to prevent excessive relative movement between said bearing and said liner and sleeve while centering said bearing within said sleeve, (g) said bearing being shorter than said liner so that a cavity exists between one end of said bearing and the double walled central portion at said inwardly extending flange, and (h) a lubricant-impregnated ring coaxially disposed within the cavity so formed.

6. The improved bearing unit of claim 5 in which the non-parallel ridges are mutually perpendicular.

7. The improved bearing unit of claim 6 in which at least one of the ridges is annular in form and at least one is parallel to the axis of the cylindrical sleeve.

8. For use with a device including a motor having a shaft extending into a fluid receiving chamber through one wall thereof, a bearing unit adapted to encircle the shaft at the juncture between the shaft and the wall, said bearing unit including:

(a) a cylindrical sleeve having a generally radially inwardly extending flange at one of its ends adapted to be spaced from the wall and a generally radially outwardly extending flange at its other end adapted to be adjacent the wall;

(b) a resilient liner for said sleeve having portions encompassing the flanges at the ends of said sleeve and having at least one non-helical projection on its own inner surface, (c) said portion encompassing said inwardly extending flange including a central portion having an aperture sized to encircle the shaft in fluid-tight contact therewith, (d) said portion encompassing said outwardly extending flange being adapted to be forced into fluid-tight contact with the wall of the chamber;

(e) an apertured bearing coaxial with and supported within said liner and sleeve and having a recess complementary to and slightly larger than said projection and adapted to rotatably support the shaft, said projection being received within said recess to prevent excessive relative movement between said bearing and said liner and sleeve while centering said bearing coaxially with said sleeve, (f) said bearing being shorter than said liner so that a cavity exists between one end of said bearing and the central portion at said inwardly extending flange; and (g) a lubricant-impregnated ring coaxially disposed within the cavity so formed.

References Cited

UNITED STATES PATENTS

| | | | |
|---|---|---|---|
| 1,731,958 | 10/1929 | Wickstrom | 308—237 |
| 1,761,533 | 6/1930 | Patch | 308—237 |
| 1,971,417 | 8/1934 | Kingston | 308—26 |
| 2,223,872 | 12/1940 | McWhorter | 308—26 |
| 2,950,868 | 8/1960 | Lannert | 241—46.1 |
| 3,009,746 | 11/1961 | Haushalter | 308—26 |
| 3,073,654 | 1/1963 | Richey | 308—26 |
| 3,112,077 | 11/1963 | Yartz | 241—72 |
| 3,150,900 | 9/1964 | Bruenig | 308—237 X |
| 3,231,166 | 1/1966 | George | 308—237 |
| 3,241,892 | 3/1966 | Oishei | 308—26 |
| 3,241,891 | 3/1966 | Farison | 308—36.1 X |
| 3,243,240 | 3/1966 | Arthur | 308—36.1 |
| 3,268,280 | 8/1966 | Miller | 308—36.1 |
| 2,047,569 | 7/1936 | Loomis | 277—212 X |
| 2,554,008 | 5/1951 | Burger | 308—26 X |
| 2,562,595 | 7/1951 | Blue. | |
| 2,859,993 | 11/1958 | Estey | 277—212 |
| 3,025,113 | 3/1962 | Helwig | 308—36.1 |
| 3,080,874 | 3/1963 | Brucken | 134—115 |
| 3,097,060 | 7/1963 | Sullivan | 308—26 X |
| 3,119,624 | 1/1964 | Freed | 277—208 X |
| 3,184,933 | 5/1965 | Gaugler | 134—188 X |
| 3,215,477 | 11/1965 | Arthur | 308—36.1 X |
| 3,239,286 | 3/1966 | Harrison | 308—36.1 X |

FOREIGN PATENTS

| | | |
|---|---|---|
| 649,861 | 2/1951 | Great Britain. |
| 757,124 | 9/1956 | Great Britain. |
| 814,417 | 6/1959 | Great Britain. |
| 850,756 | 10/1960 | Great Britain. |
| 881,607 | 11/1961 | Great Britain. |
| 1,135,279 | 4/1957 | France. |

EDGAR W. GEOGHEGAN, *Primary Examiner.*

MARTIN P. SCHWADRON, *Examiner.*

L. L. JOHNSON, *Assistant Examiner.*